United States Patent
Satpute et al.

(10) Patent No.: US 12,063,399 B2
(45) Date of Patent: Aug. 13, 2024

(54) RELIABLE TRANSMISSIONS IN VR AND AR SYSTEMS

(71) Applicant: QUALCOMM Incorporated, San Diego, CA (US)

(72) Inventors: Anand Prabhakar Satpute, Bangalore (IN); Sandeep Kanakapura Lakshmikantha, Bangalore (IN); Vinay Melkote Krishnaprasad, Bangalore (IN); Ajit Venkat Rao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/922,271

(22) PCT Filed: Jun. 7, 2021

(86) PCT No.: PCT/US2021/036222
§ 371 (c)(1),
(2) Date: Oct. 28, 2022

(87) PCT Pub. No.: WO2021/257315
PCT Pub. Date: Dec. 23, 2021

(65) Prior Publication Data
US 2023/0188768 A1    Jun. 15, 2023

(30) Foreign Application Priority Data
Jun. 19, 2020 (IN) .............................. 202041025958

(51) Int. Cl.
*H04N 21/2385*     (2011.01)
*H04L 65/65*       (2022.01)
(Continued)

(52) U.S. Cl.
CPC ......... *H04N 21/2385* (2013.01); *H04L 65/65* (2022.05); *H04N 21/23418* (2013.01); *H04N 21/6375* (2013.01)

(58) Field of Classification Search
CPC ......... H04N 21/2385; H04N 21/23418; H04N 21/6375; H04L 65/65
See application file for complete search history.

(56) References Cited

U.S. PATENT DOCUMENTS

2008/0025210 A1 * 1/2008 Honary .................. H04W 8/04
                                                   370/389
2009/0300459 A1 * 12/2009 Fukuoka ............... H04L 1/1825
                                                   714/751
(Continued)

FOREIGN PATENT DOCUMENTS

GB      2499001 A       8/2013
WO      2012154808 A2  11/2012

OTHER PUBLICATIONS

Bova T., et al., "Reliable UDP Protocol, draft-ietf-sigtran-reliableudp-00.txt", Networking Working Group Internet Draft, XX, XX , Feb. 25, 1999 (Feb. 25, 1999), pp. 1-17, XP002555265, Retrieved from the Internet : URL: http://www.ietf.org/proceedings/44/1-D/draft-ietf-sigtran-reliable-udp-00.txt. [Retrieved on Nov. 16, 2009] p. 12.

(Continued)

*Primary Examiner* — Randy A Flynn
(74) *Attorney, Agent, or Firm* — QUALCOMM Incorporated

(57) ABSTRACT

The present disclosure relates to methods and apparatus for video processing. In one aspect, the apparatus may configure at least one frame of plurality of frames in a video stream. The apparatus may also divide the at least one frame into one or more slices, each of the one or more slices including one or more data packets. The apparatus may also map each of the one or more slices to one of one or more communication (Continued)

channels. The apparatus may also transmit each of the one or more slices including the one or more data packets via the one of the one or more communication channels. In another aspect, the apparatus may receive each of one or more slices via one of one or more communication channels. The apparatus may also decode each of the one or more slices including one or more data packets.

29 Claims, 10 Drawing Sheets

(51) Int. Cl.
*H04N 21/234* (2011.01)
*H04N 21/6375* (2011.01)

(56) References Cited

U.S. PATENT DOCUMENTS

| | | | |
|---|---|---|---|
| 2013/0202025 A1* | 8/2013 | Baron | H04N 21/2385 375/240.02 |
| 2018/0331880 A1* | 11/2018 | Wu | H04N 21/6375 |
| 2018/0332342 A1 | 11/2018 | Wu et al. | |
| 2021/0037250 A1* | 2/2021 | Makar | H04N 19/174 |

OTHER PUBLICATIONS

Dunberg A., "Evaluation of Reliable Network Communication Solutions in an Industrial Environment", Jan. 1, 2007 (Jan. 1, 2007), pp. 1-49, XP055426875, Sweden, Stockholm, Retrieved from the Internet: URL: http://www.nada.kth.se/utbildning/grukth/exjobb/rapportlistor/2007/rapporter07/dunberg_albert_07019.pdf. [Retrieved on Nov. 20, 2017] paragraph 12.5 .21.

Feamister N., et al., "Packet Loss Recovery for Streaming Video", International Workshop on Packet Video, XX, XX, Apr. 1, 2002 (Apr. 1, 2002), XP002342565, 11 Pages, Abstract.

International Search Report and Written Opinion—PCT/US2021/036222—ISA/EPO—Sep. 7, 2021.

Miyazaki A., et al., "RTP Payload Formats to Enable Multiple Selective Retransmissions", draft-ietf-avt-rtp-selret-03.txt, Expires: May 2002, 5. JCT-VC, Meeting, 96. MPEG Meeting, Mar. 16, 2011-Mar. 23, 2011, Geneva, (Joint Collaborative Team on Video Coding of ISO/IEC JTC1/SC29/WG11 and ITU-T SG. 16), vol. avt, No. 3, Nov. 1, 2001 (Nov. 1, 2001), pp. 1-24, XP002192131, ISSN:0000-0004, p. 11, paragraph 6—p. 12.

Rojviboonchai K., et al., "An Evaluation of Multi-path Transmission Control Protocol (M(TCP) with Robust Acknowledgement Schemes", Internet Citation, Oct. 1, 2002 (Oct, 1, 2002), XP002377902, 8 Pages, Retrieved from the Internet: URL: http://www.internetconference.org/ic2002/PDF/rojviboonchai-kultida.pdf. [Retrieved on Apr. 21, 2006] the whole document.

* cited by examiner

RELIABLE TRANSMISSIONS IN VR AND AR SYSTEMS

CROSS REFERENCE TO RELATED APPLICATION(S)

This application is National Stage Application filed under 35 U.S.C. § 371 of PCT International Application No. PCT/US2021/036222, entitled "METHODS AND APPARATUS FOR RELIABLE TRANSMISSIONS IN VR AND AR SYSTEMS" and filed Jun. 7, 2021, which claims the benefit of Indian Application No. 202041025958, entitled "METHODS AND APPARATUS FOR RELIABLE TRANSMISSIONS IN VR AND AR SYSTEMS" and filed on Jun. 19, 2020, which are expressly incorporated by reference herein in their entirety.

TECHNICAL FIELD

The present disclosure relates generally to processing systems and, more particularly, to one or more techniques for video processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

BRIEF SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a server. The apparatus may configure at least one frame of a video stream. The apparatus may also generate at least one frame of a video stream. The apparatus may also divide the at least one frame into one or more slices, each of the one or more slices including one or more data packets. Additionally, the apparatus may analyze content of each of the one or more slices of the at least one frame. The apparatus may also map each of the one or more slices to one of the one or more communication channels. The apparatus may also encode each of the one or more slices including the one or more data packets. Further, the apparatus may transmit each of the one or more slices via the one of the one or more communication channels. The apparatus may also calculate a timeout period for each of the one or more packets. The apparatus may also receive an acknowledgment (ACK) for each of the one or more packets that is successfully communicated. The apparatus may also retransmit each of the one or more packets that are unsuccessfully communicated within the timeout period. The apparatus may also receive an ACK for each of the one or more packets that is unsuccessfully communicated within the timeout period.

In another aspect of the disclosure, a method, a computer-readable medium, and an apparatus are provided. The apparatus may be a client device. The apparatus may receive each of the one or more slices via one of one or more communication channels, the one or more slices corresponding to at least one frame of a plurality of frames in a video stream, each of the one or more slices including one or more data packets, each of the one or more slices being mapped to the one of the one or more communication channels. The apparatus may also transmit an acknowledgment (ACK) for each of the one or more packets that is successfully communicated. Additionally, the apparatus may transmit an ACK for each of the one or more packets that is unsuccessfully communicated within the timeout period. The apparatus may also decode each of the one or more slices including the one or more data packets. The apparatus may also store the at least one frame including the decoded one or more slices and/or display the at least one frame including the decoded one or more slices.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
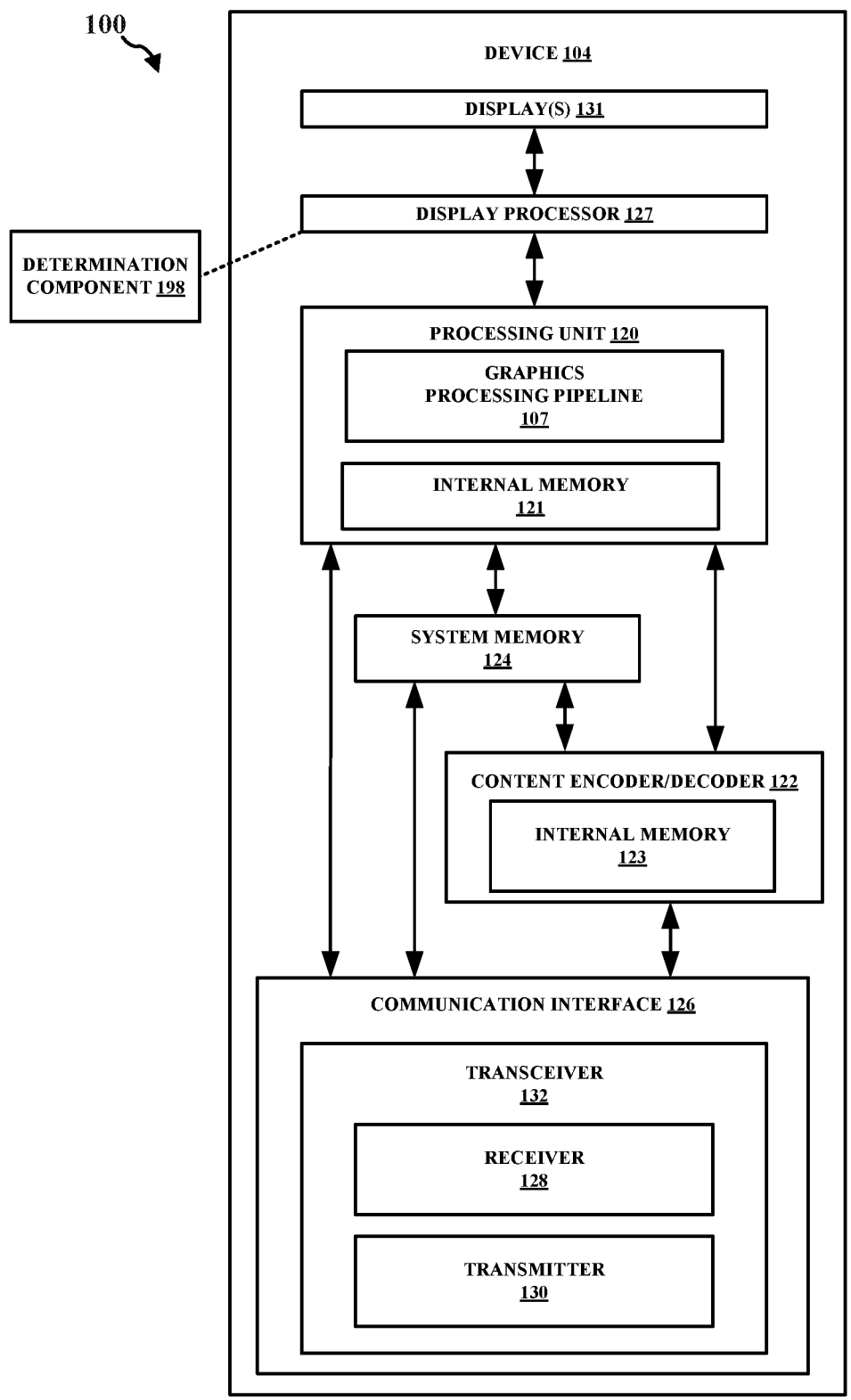
FIG. 1 is a block diagram that illustrates an example content generation system in accordance with one or more techniques of this disclosure.

Remote virtual reality (VR) or augmented reality (AR) systems may include a number of data packet losses and timeouts during the data transmission process. Packets or slices that arrive after the timeout period may be dropped. For dropped packets or slices, if some packets are lost then the whole slice may be dropped as the decoder cannot decode partial slices. So a slice may contain multiple packets, and if for some reason one of the packets is lost, then the entire slice may be lost. Also, random packet errors may be amplified, as they may effectively become burst errors. Aspects of VR or AR communication may include in-order delivery of packets, such that packets may be sequenced and delivered in order. This in-order delivery may lead to a higher latency. For instance, if a packet is lost and newer packets are received properly, the newer packets may have to wait in the queue until the older lost packets are retransmitted and received. So other packets may need to wait for missing packets to arrive. As indicated above, transmission protocols may include latency issues as all packets may need to arrive prior to processing at the decoder. Aspects of the present disclosure may utilize multichannel reliable transmission protocols with latency constrained retransmissions. For instance, aspects of the present disclosure may retransmit data packets that are lost or unsuccessfully transmitted. By doing so, aspects of the present disclosure may reduce latencies by using multiple channels and limiting the retransmissions up to certain latency constraints. As such, aspects of the present disclosure may determine the time until the packet may be useful at the receiver or client device.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a determination component 198 configured to determine at least one frame of a video stream. The determination component 198 may also be configured to generate at least one frame of a video stream. The determination component 198 may also be configured to divide the at least one frame into one or more slices, each of the one or more slices including one or more data packets. The determination component 198 may also be configured to analyze content of each of the one or more slices of the at least one frame. The determination component 198 may also be configured to map each of the one or more slices to one of the one or more communication channels. The determination component 198 may also be configured to encode each of the one or more slices including the one or more data packets. The determination component 198 may also be configured to transmit each of the one or more slices via one of one or more communication channels. The determination component 198 may also be configured to calculate a timeout period for each of the one or more packets. The determination component 198 may also be configured to receive an acknowledgment (ACK) for each of the one or more packets that are successfully communicated. The determination component 198 may also be configured to retransmit each of the one or more packets that are unsuccessfully communicated within the timeout period. The determination component 198 may also be configured to receive an ACK for each of the one or more packets that are unsuccessfully communicated within the timeout period.

The determination component 198 may also be configured to receive each of one or more slices via one of one or more communication channels, the one or more slices corresponding to at least one frame of a plurality of frames in a video stream, each of the one or more slices including one or more data packets, each of the one or more slices being mapped to the one of the one or more communication channels. The determination component 198 may also be configured to transmit an acknowledgment (ACK) for each of the one or more packets that are successfully communicated. The determination component 198 may also be configured to transmit an ACK for each of the one or more packets that are unsuccessfully communicated within the timeout period. The determination component 198 may also be configured to decode each of the one or more slices including the one or more data packets. The determination component 198 may also be configured to store the at least one frame including the decoded one or more slices and/or display the at least one frame including the decoded one or more slices.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may change the corresponding context. Additionally, the workload that corresponds to the mode or state may follow the changing mode or state.

Figure 2:
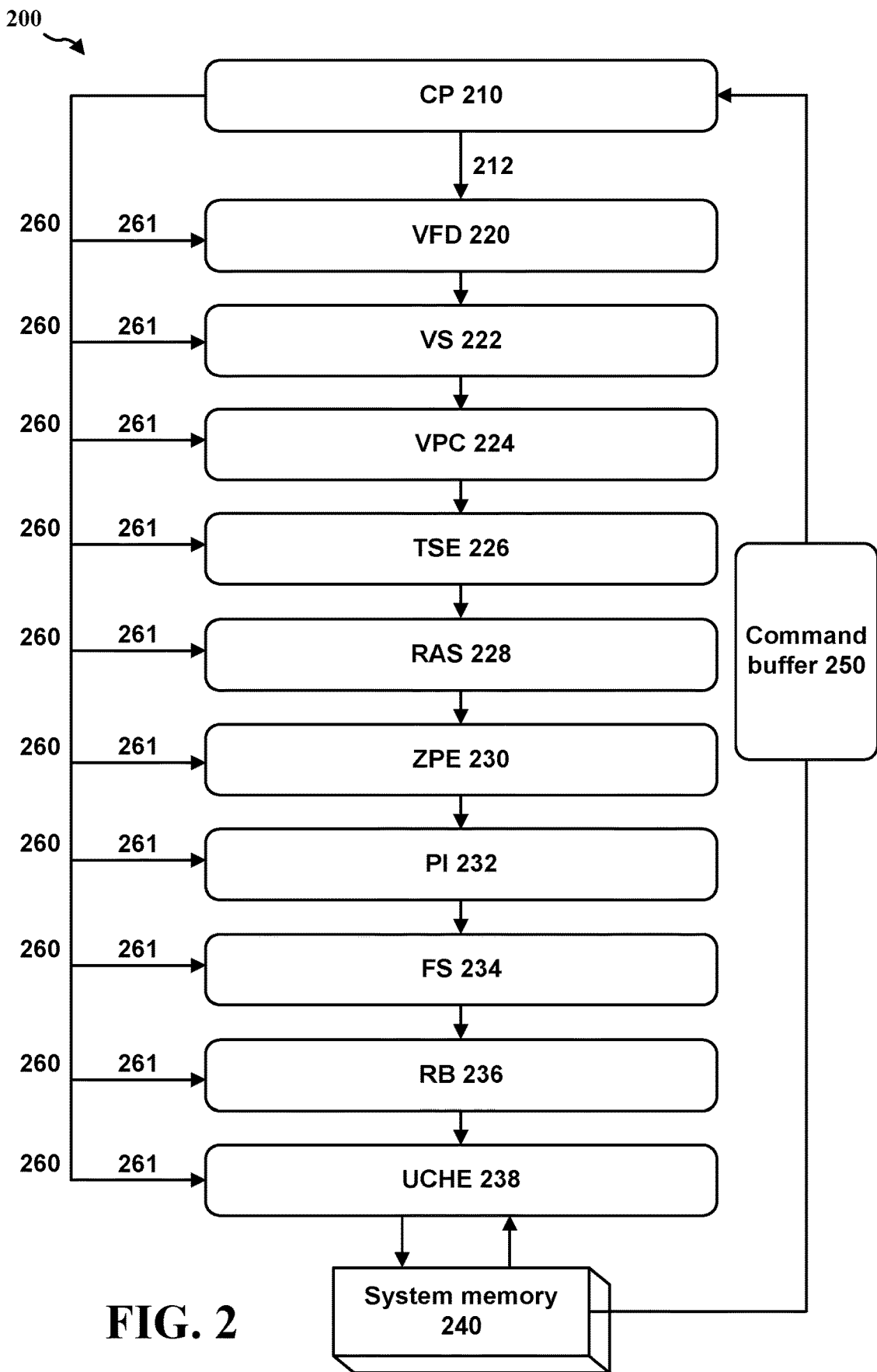
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call data packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified.

In some aspects, GPUs may apply the drawing or rendering process to different bins or tiles. For instance, a GPU may render to one bin, and perform all the draws for the primitives or pixels in the bin. During the process of rendering to a bin, the render targets may be located in the GPU internal memory (GMEM). In some instances, after rendering to one bin, the content of the render targets may be moved to a system memory and the GMEM may be freed for rendering the next bin. Additionally, a GPU may render to another bin, and perform the draws for the primitives or pixels in that bin. Therefore, in some aspects, there might be a small number of bins, e.g., four bins, that cover all of the draws in one surface. Further, GPUs may cycle through all of the draws in one bin, but perform the draws for the draw calls that are visible, i.e., draw calls that include visible geometry. In some aspects, a visibility stream may be generated, e.g., in a binning pass, to determine the visibility information of each primitive in an image or scene. For instance, this visibility stream may identify whether a certain primitive is visible or not. In some aspects, this information may be used to remove primitives that are not visible, e.g., in the rendering pass. Also, at least some of the primitives that are identified as visible may be rendered in the rendering pass.

In some aspects of tiled rendering, there may be multiple processing phases or passes. For instance, the rendering may be performed in two passes, e.g., a visibility or bin-visibility pass and a rendering or bin-rendering pass. During a visibility pass, a GPU may input a rendering workload, record the positions of the primitives or triangles, and then determine which primitives or triangles fall into which bin or area. In some aspects of a visibility pass, GPUs may also identify or mark the visibility of each primitive or triangle in a visibility stream. During a rendering pass, a GPU may input the visibility stream and process one bin or area at a time. In some aspects, the visibility stream may be analyzed to determine which primitives, or vertices of primitives, are visible or not visible. As such, the primitives, or vertices of primitives, that are visible may be processed. By doing so, GPUs may reduce the unnecessary workload of processing or rendering primitives or triangles that are not visible.

In some aspects, during a visibility pass, certain types of primitive geometry, e.g., position geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information may be used to determine or generate a visibility stream. In a rendering pass, the primitives in each bin may be rendered separately.

In these instances, the visibility stream may be fetched from memory used to drop primitives which are not visible for that bin.

Aspects of communications systems may be applied to remote virtual reality (VR), augmented reality (AR), or extended reality (XR) systems. In remote VR, AR, or XR systems, a portion of the processing or rendering may occur on remote servers. In some instances, at the server, an application or game may be rendered for a user pose stream. Also, a user may utilize a client device including a display or head mounted display (HMD). A user pose may be transmitted to the server. The user may also transmit sensor or actuator data from the HMD or head pose. The server may also transmit the pose, a compressed rendered video, or audio buffers.

In some aspects, by utilizing the pose, the latest frames may be rendered at the server and then transmitted back to the client device. Render buffers may also be generated on the server side. Further, rendered frames may be encoded as a video stream and transmitted wirelessly to an HMD. Once received by the user, these frames may be displayed at the display or HMD. Additionally, in some aspects, wireless transmission via real-time transport protocol (RTP) packets may imply lossy reception of the video on the HMD.

Figure 3:
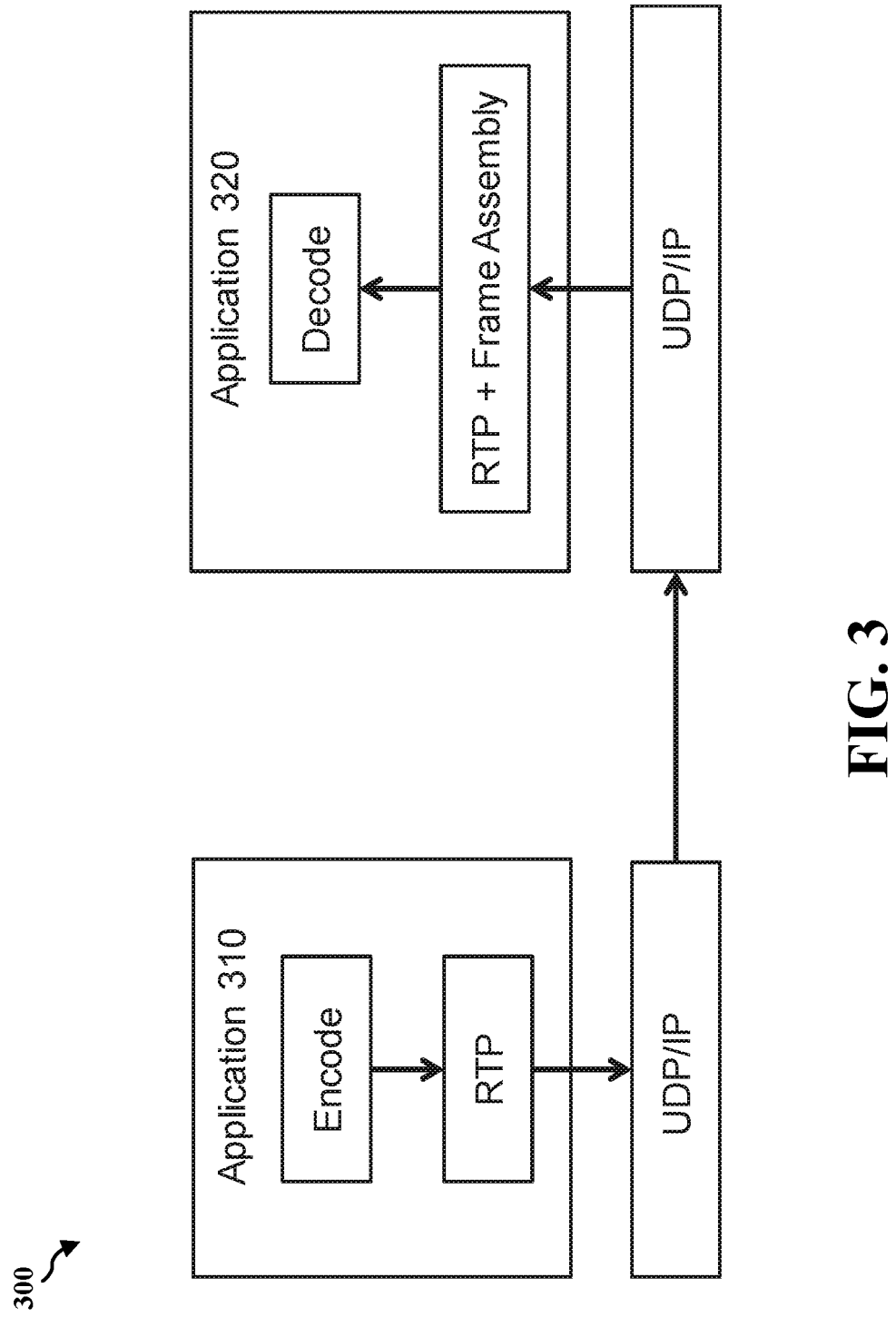
FIG. 3 illustrates a diagram including an example reliable transmission technique in accordance with one or more techniques of this disclosure.

FIG. 3 illustrates diagram 300 including a reliable transmission technique in accordance with one or more techniques of this disclosure. As shown in FIG. 3, diagram 300 includes application or server 310 and application or client device 320. FIG. 3 shows a remote VR system including a number of processes, including data flow, packetization, and depacketization processes.

On the server 310, images or frames may be encoded and then passed through an RTP packetization process. The RTP packets may then be transmitted via a user datagram protocol (UDP) internet protocol (IP) (UDP/IP) network protocol. On the client device 320, the RTP packets may be received via a UDP/IP network protocol. The RTP packets may also pass through a RTP depacketizer and a frame assembly. Additionally, the frame assembly may process the RTP packets, and then send the packets to a decoder. After being decoded, the packets may be sent to a display or HMD.

Figure 4:
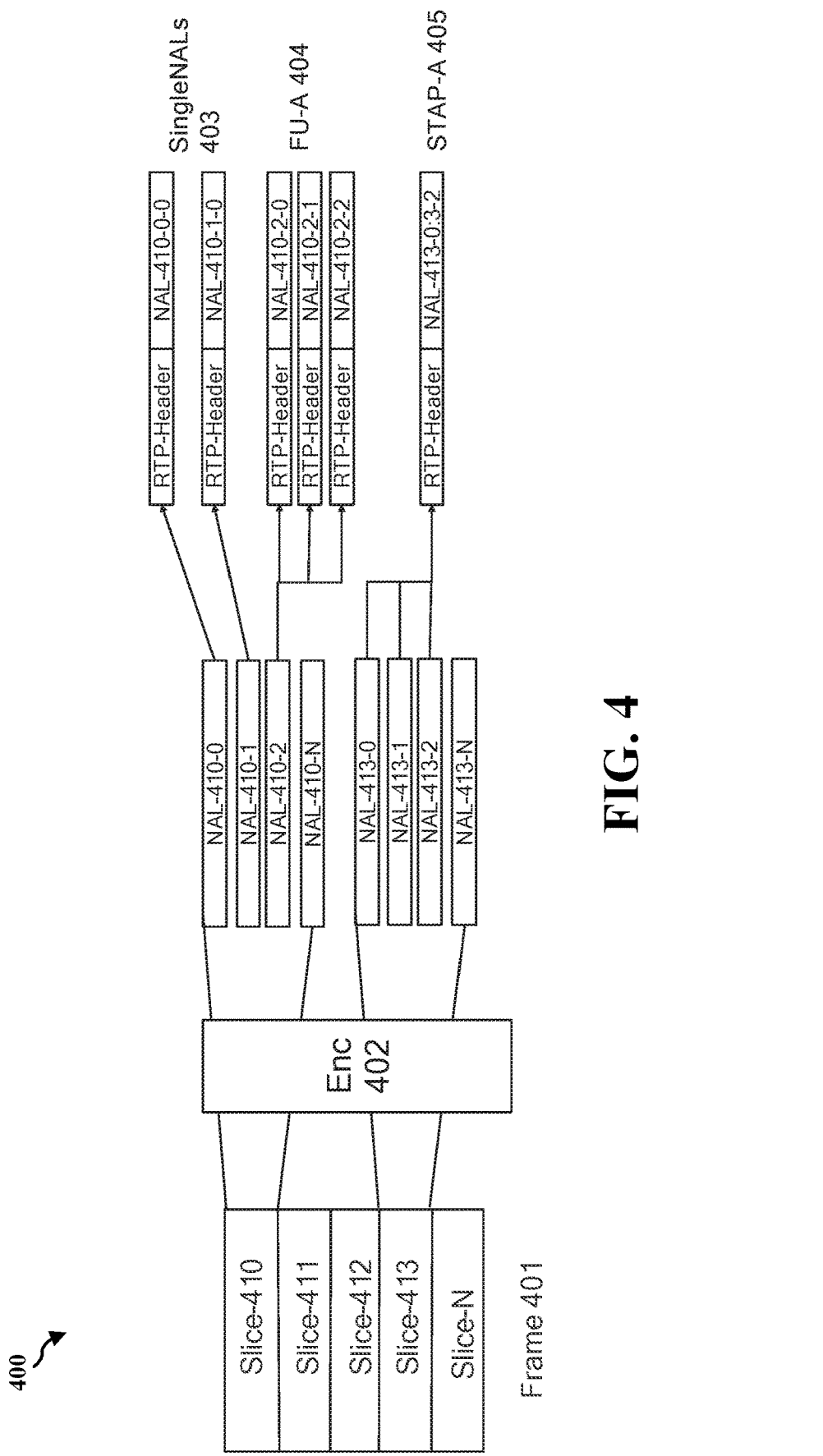
FIG. 4 illustrates a diagram including an example reliable transmission technique in accordance with one or more techniques of this disclosure.

FIG. 4 illustrates diagram 400 including a reliable transmission technique in accordance with one or more techniques of this disclosure. FIG. 4 displays a remote VR or AR system including RTP packets. As shown in FIG. 4, diagram 400 includes frame 401 and encoder 402. Frame 401 includes a number of slices, e.g., slice 410, slice 411, slice 412, slice 413, slice N. As shown in FIG. 4, the frame-to-packet structure may be as follows: a frame includes one or more slices, a slice includes one or more network abstraction layer (NAL) units, and a NAL unit includes one or more RTP packets. The RTP packets may be sent as UDP packets over the network.

As shown in FIG. 4, frame 401 may be divided into N slices. Each slice may be encoded and correspond to at least one NAL unit, e.g., slice 410 may correspond to NAL-410-0 through NAL-410-N and slice 413 may correspond to NAL-413-0 through NAL-413-N. Each NAL unit may be packetized into one or more RTP packets, e.g., NAL-410-0-0. Additionally, there may be several types of RTP packets, e.g., single NALs 403, fragmentation unit (FU) type A (FU-A) 404, and single-time aggregation packet (STAP) type A (STAP-A) 405.

As indicated above, a frame may be spatially divided into different slices, e.g., one or more rows of pixels for each slice. Each slice may then be encoded into a number of bits. So the amount of bits per slice may be correspond to one or more NAL units, which may correspond to one or more RTP packets. Each slice at the encoder may be transferred as one or more RTP packets. In some aspects, one or more NAL units may be aggregated into a single RTP packet. The above aggregation may depend on the network maximum transmission unit (MTU), i.e., the amount of data that may be transmitted per unit. So the size of the slice may dictate the size of the NAL units and/or RTP packets.

Remote VR or AR systems may include a frame assembly. There may also be a number of packet losses and timeouts during the transmission process. Frame assemblies may include a number of different steps or processes for the transmission. For instance, frame assemblies may collect one frame including RTP packets and send it to the decoder. Frame assemblies may also handle out-of-order packets. Further, frame assemblies may calculate a timeout period, such as by waiting for N milliseconds in order to handle packets that arrive late. Packets or slices that arrive after the timeout period may be dropped. For dropped packets or slices, if some packets are lost then the whole slice may be dropped as the decoder cannot decode partial slices. So a slice may contain multiple packets, and if for some reason one of the packets is lost, then the entire slice may be lost.

In some aspects, a single packet loss may result in an entire slice loss, as the decoder may not be able to decode partial slices. Also, random packet errors may be amplified, as they may effectively become burst errors. For example, consider a frame of size 150 kB including 10 slices, so the size of one slice is 15 kB. If a network maximum transmission unit (MTU) is 1500, then there may be 10 packets for a particular slice. So one packet loss may result in an entire slice lost or 10 packets lost. As such, packet error may get amplified by a certain factor, e.g., a factor of 10.

Reliable UDP (RUDP) transmission processes may include a reliable connection. For instance, RUDP may enable reliable transmission of packets, as well as support acknowledgements (ACKs) and retransmission of packets. Moreover, ACKs may be sent as soon as a packet is received. In some instances, packets are retransmitted if an ACK is not received for a certain amount of time, i.e., a timeout period.

Aspects of VR or AR communication may include in-order delivery of packets, such that packets may be sequenced and delivered in order. Packets may be maintained in a buffer until the missing packets are received or retransmitted. In some aspects, each channel may be multiplexed over a single UDP connection. Also, each channel may have a separate window, such that the channel does not block other channels. Further, each packet may be acknowledged and missing packets may be retransmitted. In addition, there may be in-order packet delivery for each channel.

As indicated above, RUDP may also correspond to in-order delivery, which may lead to a higher latency. For instance, if a packet is lost and newer packets are received properly, the newer packets may have to wait in a queue until the older lost packets are retransmitted and received. So other packets may need to wait for missing packets to arrive. For example, packets that have arrived may be kept in a buffer until the missing packets arrive. Effectively, if the first slice of a frame is not received but the subsequent slices have been received, the subsequent slices may not be forwarded to the RTP layer and subsequently to the decoder, which may increase the amount of latency.

As indicated above, RUDP may be a reliable protocol in which to transmit packets, but there may be latency issues as all packets may need to arrive prior to processing at the decoder. Accordingly, it may be beneficial to allow for multichannel reliable UDP with latency constrained retransmissions. Further, it may be beneficial to retransmit data packets that are lost or unsuccessfully transmitted.

Aspects of the present disclosure may utilize multichannel reliable UDP with latency constrained retransmissions. For instance, aspects of the present disclosure may retransmit data packets that are lost or unsuccessfully transmitted. By doing so, aspects of the present disclosure may reduce latencies by using multiple channels and limiting the retransmissions up to certain latency constraints. As such, aspects of the present disclosure may determine the time until a packet may be useful at the receiver or client device.

Additionally, aspects of the present disclosure may utilize multichannel time constrained transmission. For instance, aspects of the present disclosure may use a reliable delivery protocol, e.g., RUDP, connection with multiple channels. Aspects of the present disclosure may also send each slice on a separate channel. Additionally, aspects of the present disclosure may include time constrained retransmissions.

Figure 5:
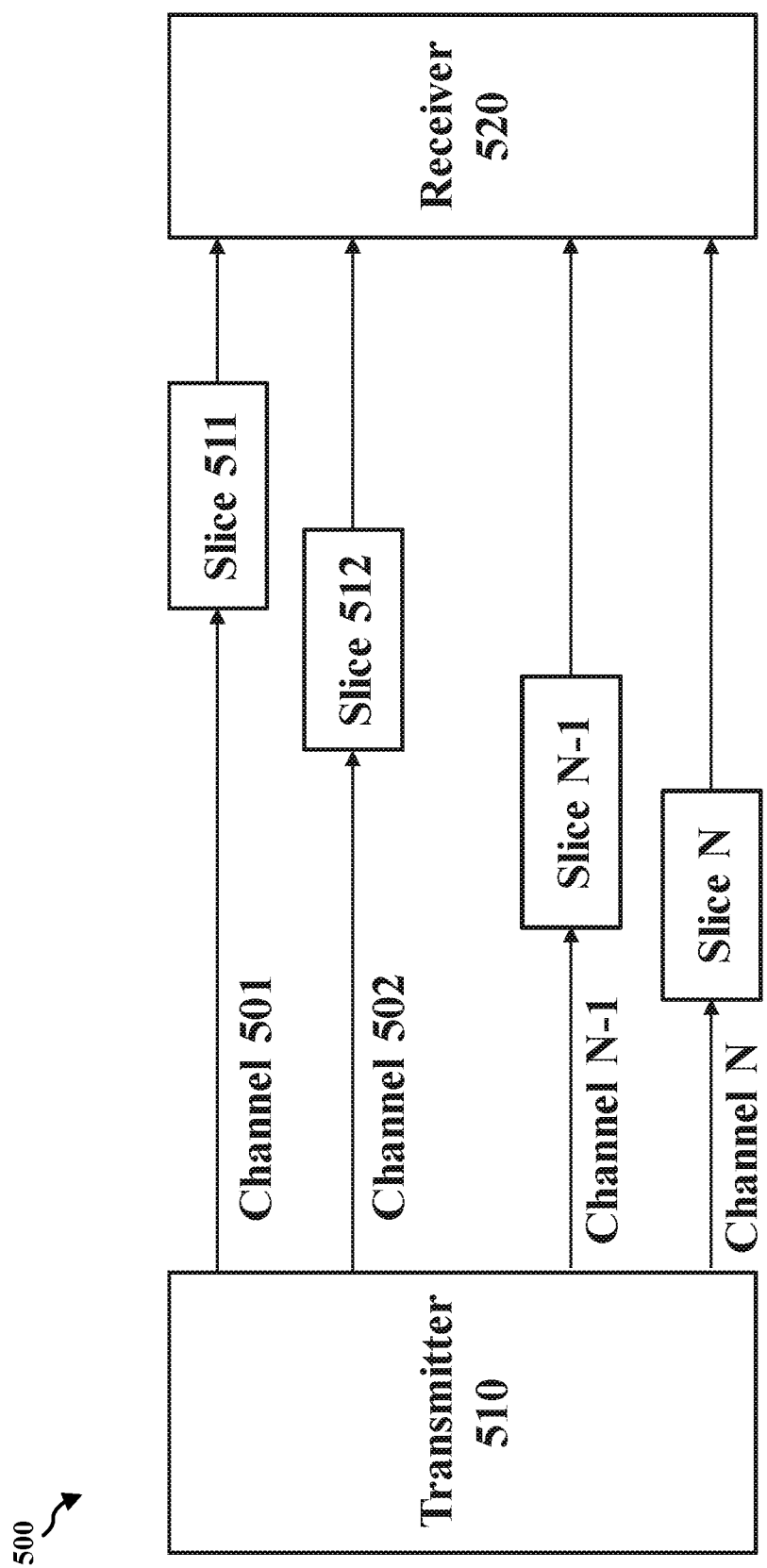
FIG. 5 illustrates a diagram including an example reliable transmission technique in accordance with one or more techniques of this disclosure.

FIG. 5 illustrates diagram 500 including a reliable transmission technique in accordance with one or more techniques of this disclosure. As shown in FIG. 5, diagram 500 may include transmitter or server 510, receiver or client device 520, a number of channels, e.g., channel 501, channel 502, channel N−1, and channel N, and a number of slices, e.g., slice 511, slice 512, slice N−1, slice N. As shown in FIG. 5, aspects of the present disclosure may transmit one video frame including a number of slices, e.g., N slices, over a number of communication channels, e.g., N channels. Each of the slices in the frame may be sent on a separate channel. As such, each of the slices may be mapped to a separate channel.

As indicated herein, aspects of the present disclosure may utilize time constrained retransmissions. In some aspects, each slice may be transmitted over a separate channel. The slices may be sent to the application as soon as they are received. The application, e.g., an RTP and frame assembly, may collect the slices into a frame and send them to the decoder. If a fragment of slice is lost, the fragment may be retransmitted. Also, the other fragments may be continuously transmitted. If a retransmitted packet arrives before an RTP frame assemble (RTP_frame_assemble) timeout, the retransmitted packet may be sent to the decoder with other slices. Further, each of the slices that have arrived may be sent to an upper layer. As a result, the application may have more time to correct the packet errors. So each of the packets that have been successfully transmitted may be sent to the decoder without any further latency issues. And mapping each slice to a separate channel may result in complete slices being sent to the decoder. If a slice is incomplete, the unsuccessfully received packets may be ACK'd, so the transmit buffers may remain clear.

Once an RTP_frame_assemble timeout is met, all packets until a certain sequence number may be ACK'd (even if they are not received) in order to avoid further retransmissions of old packets, as well as to prevent buildup of latencies due to old packets. In some aspects, after a timeout is triggered, aspects of the present disclosure may ACK each of the lost or unsuccessfully transmitted packets, so the packets may not need to be retransmitted. So each of the RTP packets may be ACK'd, including RTP packets that are successfully transmitted or unsuccessfully transmitted.

The aforementioned processes may allow for time constrained retransmission capability in latency sensitive applications, e.g., video conferences or VR/AR/XR split rendering. Accordingly, aspects of the present disclosure may modify a reliable data transmission protocol by mapping slices to different channels and/or introducing a latency constraint. As each slice may be independently mapped to a channel, slices may not block the decoding of other slices. So the transmission and decoding of slices may be independent. As such, later transmitted slices may not need to wait for an earlier slice to completely be transmitted. So the slices may not need to be decoded in order, e.g., slice 1 through slice N. And if aspects of the present disclosure are waiting for the retransmission of a certain packet, the client side may ACK this packet in order to clear the server side buffer.

Aspects of the present disclosure may result in a number of different features and benefits. For instance, aspects of the present disclosure may be more reliable compared to other protocols, e.g., UDP, due to RTP packet retransmissions. As indicated above, RTP packets lost during transmission may be retransmitted. If the retransmitted packets arrive before the frame is displayed, they may help in improving the overall quality of the displayed frame. If the retransmissions arrive after the frame is displayed, they may be discarded.

Also, aspects of the present disclosure may include lower latencies than other protocols, e.g., transmission control protocol (TCP), due to the multichannel transmissions. For instance, if a channel is waiting for retransmissions, it may not block an entire connection. Additionally, other channels may keep receiving the RTP packets. On meeting the latency constraint of a channel, each packet in the channel up to the last sequence number may be marked as acknowledged and may not be retransmitted again, even if the packet has not been received. This may prevent latency build up due to a retransmission of packets that are no longer needed by the client due to latency constraints.

Aspects of the present disclosure may also include a number of different channels that may have different latency constraints. Depending on the concealability of the content, the channels may have different latency constraints. So channels with highly concealable content may have a tighter latency constraint, i.e., the slices may be passed to the RTP layer immediately, as they may be easily concealed. In some aspects, even if some data packets or slices are missing, they may be ACK'd immediately. This may prevent latency build-up due to RTP packets that may be easily concealed on the client device.

In some instances, when a slice is lost, the portion of the frame corresponding to the slice may be replaced from the previous frame. So the decoder may fill lost slices based on previously decoded portions of the frame. As such, lost slices may be copied from portions of previously decoded frames. This may occur for portions of the frame that are easily predicted. For slices that may not be easily predicted, the lost packets may be needed, so aspects of the present disclosure may allow for a higher latency period. So a different timeout length may be imposed on different packets or slices. And packets including a higher sensitivity to losses or unsuccessful transmissions may correspond to a higher latency period. Accordingly, aspects of the present disclosure may adjust the timeout length for different packets or slices depending on the sensitivity to losses or unsuccessful transmissions for those packets or slices.

One way of imposing an adjustable timeout length may be based on the predictability of the content of the slice or packet. So packets or slices that are likely to be repeated may include a lower timeout length than a packet or slice that is less likely to be repeated. Aspects of the present disclosure may also analyze motion vectors from previous frames to determine if there are any moving objects in these slices or packets. For the slices or packets with motion vectors, aspects of the present disclosure may allow for an increased timeout length. Aspects of the present disclosure may also detect a user head movement at the HMD to determine the amount of motion vectors and/or how predictable the content may be at certain slices or packets. As indicated above, the generation and consumption of content may be on separate devices, e.g., a server and/or a client device.

As mentioned above, different slices may be mapped to different channels. In some aspects, there may be a maximum number of channels, e.g., N channels, per connection and the slices of each frame may cycle through the different channels. For example, if N=250 channels and each frame has 10 slices, then frame 1 may correspond to channels 1 to 10. Additionally, frame 2 may correspond to channels 11 to 20, frame 3 may correspond to channels 21 to 30, etc. Also, frame 25 may correspond to channels 241 to 250. After all of the frames have been allocated to each of the channels, the frame-to-channel allocation may start over. For example, frame 26 may correspond to channels 1 to 10.

At least one benefit of mapping different frames to different channels is including an automatic channel index based timeout logic. So any packet in a channel that has been transmitted may be ACK'd, even if the packet is lost or unsuccessfully transmitted. As such, aspects of the present disclosure may ACK a certain packet even if it has not yet been transmitted. Additionally, multiple video streams, e.g., for each eye-buffer, may be transmitted on separate RUDP connections or different sockets, where each RUDP connection or socket may have its own channel and/or context.

Aspects of the present disclosure may include a number of different methods or processes. For instance, aspects of the present disclosure may include a method of sending packets of a video stream over a single reliable in-order delivery protocol, where reliability and in-order delivery is independently maintained for each independently decodable unit of a video frame. Accordingly, under a latency constraint a partial set of slices may be immediately decoded. Additionally, on meeting the latency constraint for each channel, all packets in that channel to the last sequence number may be acknowledged and may not be retransmitted again, even if they have not been received. Further, different channels may have different latency constraints, and the constraints may depend on the concealability of the content. So if the content is highly concealable, there may be a lower latency constraint and the packets may be acknowledged faster, even if they are not yet successfully transmitted.

Figure 6:
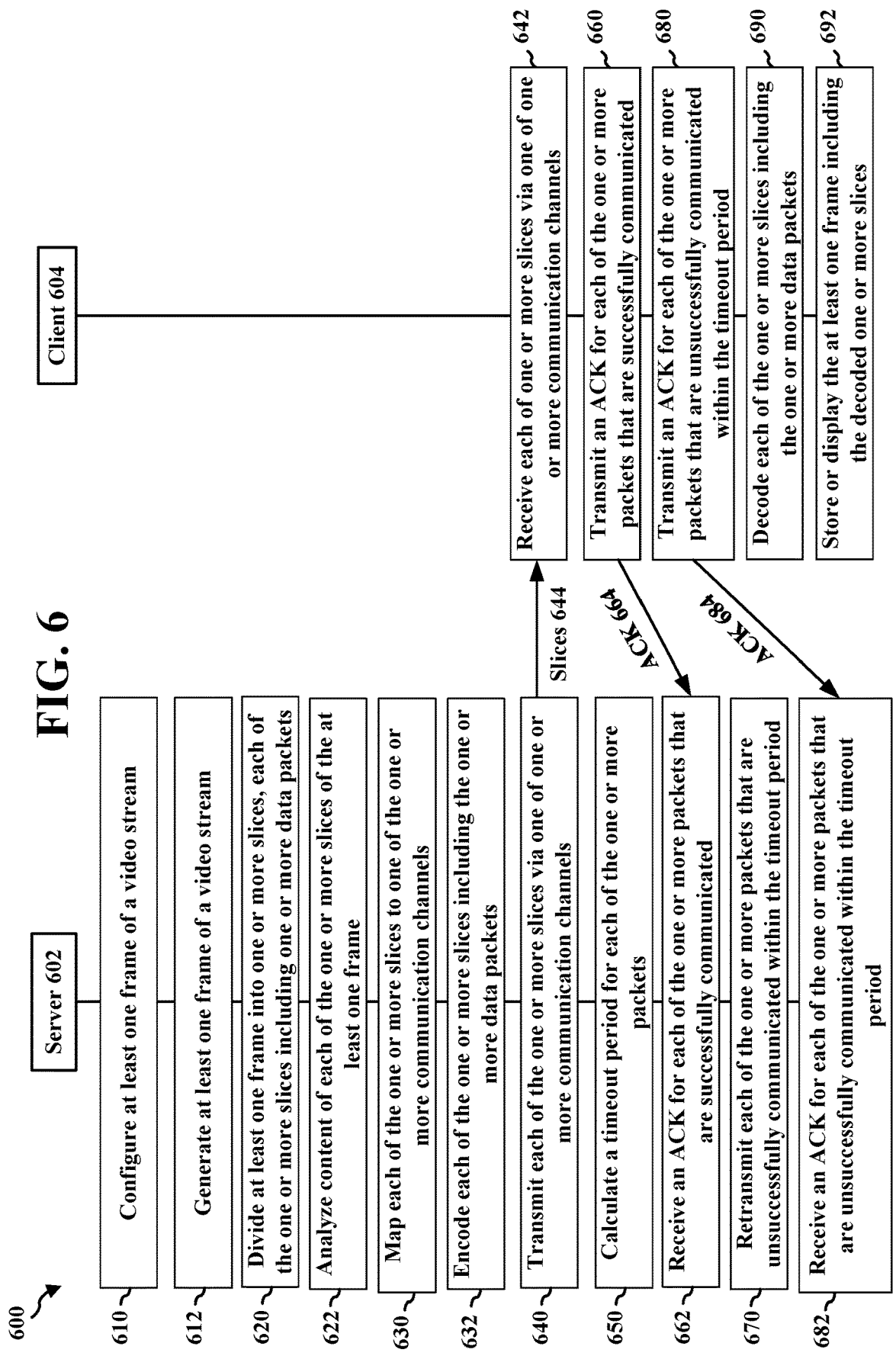
FIG. 6 illustrates a diagram including example communication between a server and a client device in accordance with one or more techniques of this disclosure.

FIG. 6 illustrates a diagram 600 including example communication in accordance with one or more techniques of this disclosure. More specifically, diagram 600 includes communication between a server 602 and a client device 604. As described herein, server 602 and client device 604 may perform a number of different steps or processes to perform reliable transmission techniques. FIG. 6 illustrates the communication of each of these components during video or frame processing. As shown in FIG. 6, each of the components in diagram 600 may communicate with one or more additional components. For instance, server 602 may communicate with client device 604, and vice versa.

At 610, server 602 may configure at least one frame of a video stream. Also, at 612, server 602 may generate at least one frame of a video stream.

At 620, server 602 may divide the at least one frame into one or more slices, each of the one or more slices including one or more data packets.

At 622, server 602 may analyze content of each of the one or more slices of the at least one frame. In some aspects, the content of each of the one or more slices may correspond to a portion of content in the at least one frame. Also, the content of each of the one or more slices may be analyzed with a motion detector.

At 630, server 602 may map each of the one or more slices to one of the one or more communication channels.

At 632, server 602 may encode each of the one or more slices including the one or more data packets.

At 640, server 602 may transmit each of the one or more slices, e.g., slices 644, via the one of the one or more communication channels.

At 642, client device 604 may receive each of the one or more slices, e.g., slices 644, via one of one or more communication channels, the one or more slices corresponding to at least one frame of a plurality of frames in a video stream, each of the one or more slices including one or more data packets, each of the one or more slices being mapped to the one of the one or more communication channels. Further, each of the one or more slices may be received based on a reliable delivery protocol.

At 650, server 602 may calculate a timeout period for each of the one or more data packets. In some aspects, the timeout period may be calculated for each of the one or more data packets that are unsuccessfully transmitted/received. Also, the timeout period for each of the one or more data packets may be based on content of each of the one or more data packets. Further, the timeout period for each of the one or more data packets may be based on one or more motion vectors from a previous frame.

At 660, client device 604 may transmit an acknowledgment (ACK), e.g., ACK 664, for each of the one or more data packets that is successfully transmitted/received. In some aspects, each of the one or more data packets may be associated with a timeout period. Also, each of the one or more data packets that are unsuccessfully transmitted/received may be associated with the timeout period. Further, the timeout period for each of the one or more data packets may be based on content of each of the one or more data packets. Also, the timeout period for each of the one or more data packets may be based on one or more motion vectors from a previous frame.

At 662, server 602 may receive an acknowledgment (ACK), e.g., ACK 664, for each of the one or more data packets that is successfully transmitted/received.

At 670, server 602 may retransmit each of the one or more data packets that is unsuccessfully transmitted/received within the timeout period.

At 680, client device 604 may transmit an ACK, e.g., ACK 684, for each of the one or more data packets that is unsuccessfully communicated within the timeout period.

At 682, server 602 may receive an ACK, e.g., ACK 684, for each of the one or more data packets that is unsuccessfully transmitted/received within the timeout period. In some aspects, each of the one or more slices may be transmitted/received over one of the one or more communication channels. Also, each of the one or more slices may be transmitted/received based on a reliable delivery protocol. In some instances, an order of communication for each of the one or more slices may be based on content of each of the one or more slices. Additionally, the at least one frame including one or more slices may be transmitted from a server to a client device.

In some aspects, an order of communication for each of the one or more slices may be based on content of each of the one or more slices. Additionally, the at least one frame including the one or more slices may be received by a client device from a server. The content of each of the one or more slices may correspond to a portion of content in the at least one frame. Also, the content of each of the one or more slices may be based on a motion detector.

At 690, client device 604 may decode each of the one or more slices including the one or more data packets.

At 692, client device 604 may store the at least one frame including the decoded one or more slices and/or display the at least one frame including the decoded one or more slices.

Figure 7:
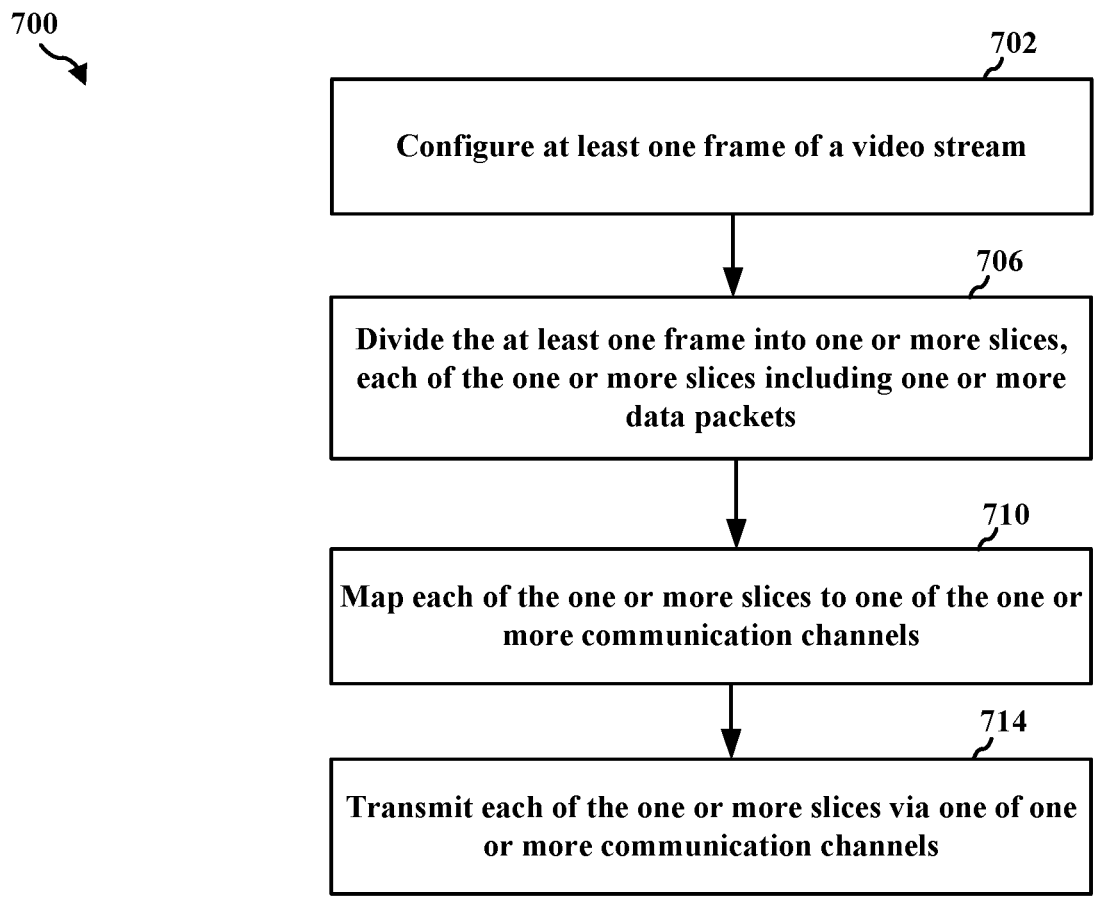
FIG. 7 illustrates an example flowchart of an example method in accordance with one or more techniques of this disclosure.

FIG. 7 illustrates a flowchart 700 of an example method in accordance with one or more techniques of this disclosure. The method may be performed by an apparatus such as a server, a client device, a display, or an apparatus for video or frame processing.

At 702, the apparatus may configure at least one frame of a video stream, as described in connection with the examples in FIGS. 3-6. For example, server 602 may configure at least one frame of a video stream, as described in connection with 610 in FIG. 6. Further, 702 may be performed by display processor 127 in FIG. 1.

At 706, the apparatus may divide the at least one frame into one or more slices, each of the one or more slices including one or more data packets, as described in connection with the examples in FIGS. 3-6. For example, server 602 may divide the at least one frame into one or more slices, each of the one or more slices including one or more data packets, as described in connection with 620 in FIG. 6. Further, 706 may be performed by display processor 127 in FIG. 1.

At 710, the apparatus may map each of the one or more slices to one of the one or more communication channels, as described in connection with the examples in FIGS. 3-6. For example, server 602 may map each of the one or more slices to one of the one or more communication channels, as described in connection with 630 in FIG. 6. Further, 710 may be performed by display processor 127 in FIG. 1.

At 714, the apparatus may transmit each of the one or more slices via the one of the one or more communication channels, as described in connection with the examples in FIGS. 3-6. For example, server 602 may transmit each of the one or more slices via the one of the one or more communication channels, as described in connection with 640 in FIG. 6. Further, 714 may be performed by display processor 127 in FIG. 1.

Figure 8:
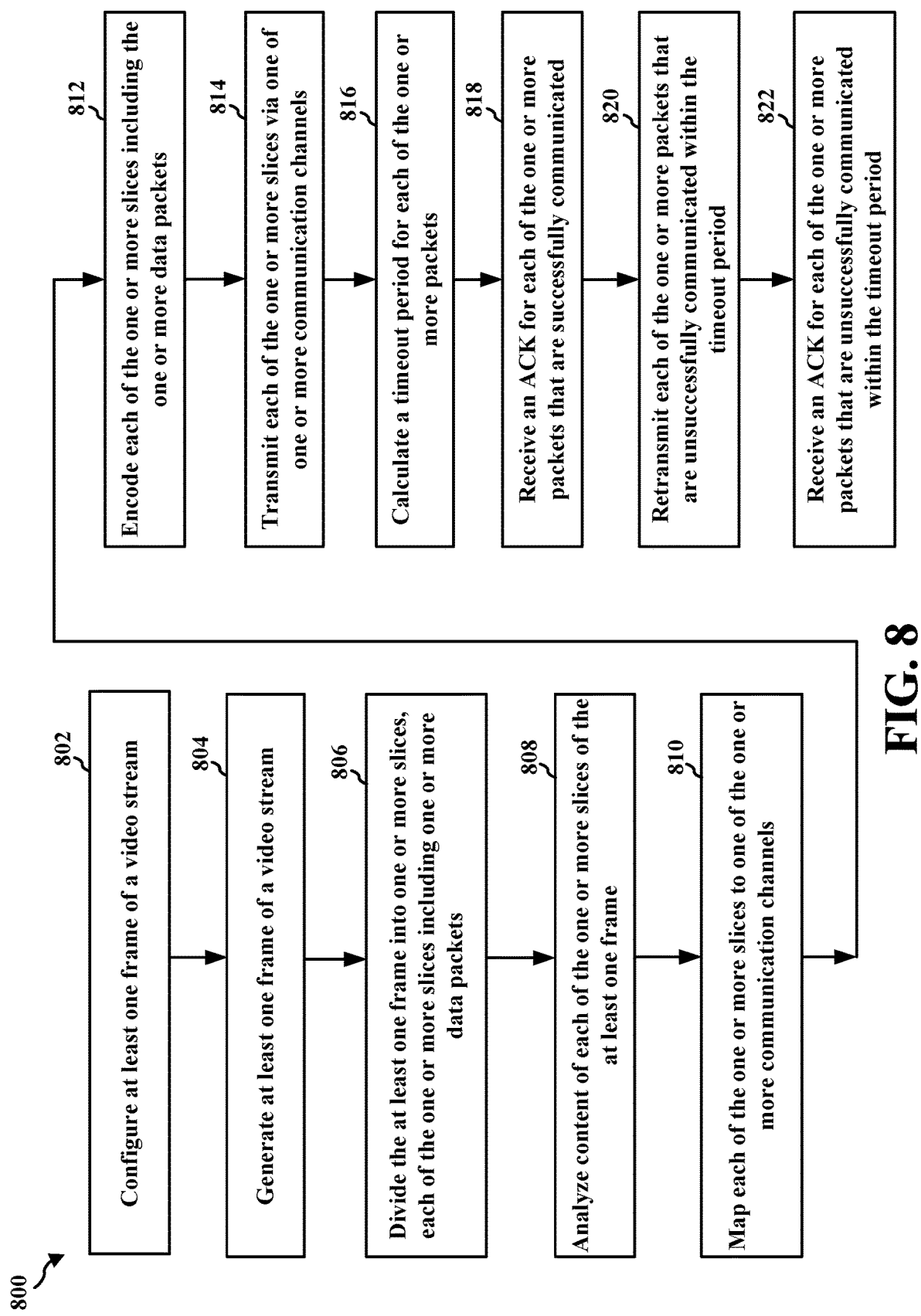
FIG. 8 illustrates an example flowchart of an example method in accordance with one or more techniques of this disclosure.

FIG. 8 illustrates a flowchart 800 of an example method in accordance with one or more techniques of this disclosure. The method may be performed by an apparatus such as a server, a client device, a display, or an apparatus for video or frame processing.

At 802, the apparatus may configure at least one frame of a video stream, as described in connection with the examples in FIGS. 3-6. For example, server 602 may configure at least one frame of a video stream, as described in connection with 610 in FIG. 6. Further, 802 may be performed by display processor 127 in FIG. 1.

At 804, the apparatus may generate at least one frame of a video stream, as described in connection with the examples in FIGS. 3-6. For example, server 602 may generate at least one frame of a video stream, as described in connection with 612 in FIG. 6. Further, 804 may be performed by display processor 127 in FIG. 1.

At 806, the apparatus may divide the at least one frame into one or more slices, each of the one or more slices including one or more data packets, as described in connection with the examples in FIGS. 3-6. For example, server 602 may divide the at least one frame into one or more slices, each of the one or more slices including one or more data packets, as described in connection with 620 in FIG. 6. Further, 806 may be performed by display processor 127 in FIG. 1.

At 808, the apparatus may analyze content of each of the one or more slices of the at least one frame, as described in connection with the examples in FIGS. 3-6. For example, server 602 may analyze content of each of the one or more slices of the at least one frame, as described in connection with 622 in FIG. 6. Further, 808 may be performed by display processor 127 in FIG. 1. In some aspects, the content of each of the one or more slices may correspond to a portion of content in the at least one frame, as described in connection with the examples in FIGS. 3-6. Also, the content of each of the one or more slices may be analyzed with a motion detector, as described in connection with the examples in FIGS. 3-6.

At 810, the apparatus may map each of the one or more slices to one of the one or more communication channels, as described in connection with the examples in FIGS. 3-6. For example, server 602 may map each of the one or more slices to one of the one or more communication channels, as described in connection with 630 in FIG. 6. Further, 810 may be performed by display processor 127 in FIG. 1.

At 812, the apparatus may encode each of the one or more slices including the one or more data packets, as described in connection with the examples in FIGS. 3-6. For example, server 602 may encode each of the one or more slices including the one or more data packets, as described in connection with 632 in FIG. 6. Further, 812 may be performed by display processor 127 in FIG. 1.

At 814, the apparatus may transmit each of the one or more slices via the one of the one or more communication channels, as described in connection with the examples in FIGS. 3-6. For example, server 602 may transmit each of the one or more slices via the one of the one or more communication channels, as described in connection with 640 in FIG. 6. Further, 814 may be performed by display processor 127 in FIG. 1.

At 816, the apparatus may calculate a timeout period for each of the one or more data packets, as described in connection with the examples in FIGS. 3-6. For example, server 602 may calculate a timeout period for each of the one or more data packets, as described in connection with 650 in FIG. 6. Further, 816 may be performed by display processor 127 in FIG. 1. In some aspects, the timeout period may be calculated for each of the one or more data packets that are unsuccessfully transmitted, as described in connection with the examples in FIGS. 3-6. Also, the timeout period for each of the one or more data packets may be based on content of each of the one or more data packets, as described in connection with the examples in FIGS. 3-6. Further, the timeout period for each of the one or more data packets may be based on one or more motion vectors from a previous frame, as described in connection with the examples in FIGS. 3-6.

At 818, the apparatus may receive an acknowledgment (ACK) for each of the one or more data packets that are successfully transmitted, as described in connection with the examples in FIGS. 3-6. For example, server 602 may receive an acknowledgment (ACK) for each of the one or more data packets that are successfully transmitted, as described in connection with 662 in FIG. 6. Further, 818 may be performed by display processor 127 in FIG. 1.

At 820, the apparatus may retransmit each of the one or more data packets that are unsuccessfully transmitted within the timeout period, as described in connection with the examples in FIGS. 3-6. For example, server 602 may retransmit each of the one or more data packets that are unsuccessfully transmitted within the timeout period, as described in connection with 670 in FIG. 6. Further, 820 may be performed by display processor 127 in FIG. 1.

At 822, the apparatus may receive an ACK for each of the one or more data packets that are unsuccessfully transmitted within the timeout period, as described in connection with the examples in FIGS. 3-6. For example, server 602 may receive an ACK for each of the one or more data packets that are unsuccessfully transmitted within the timeout period, as described in connection with 682 in FIG. 6. Further, 822 may be performed by display processor 127 in FIG. 1. In some aspects, each of the one or more slices may be transmitted over one of the one or more communication channels, as described in connection with the examples in FIGS. 3-6. Also, the at least one frame may be transmitted based on a reliable delivery protocol, as described in connection with the examples in FIGS. 3-6.

In some instances, an order of communication for each of the one or more slices may be based on content of each of the one or more slices, as described in connection with the examples in FIGS. 3-6. Additionally, the at least one frame including one or more slices may be transmitted from a server to a client device, as described in connection with the examples in FIGS. 3-6.

Figure 9:
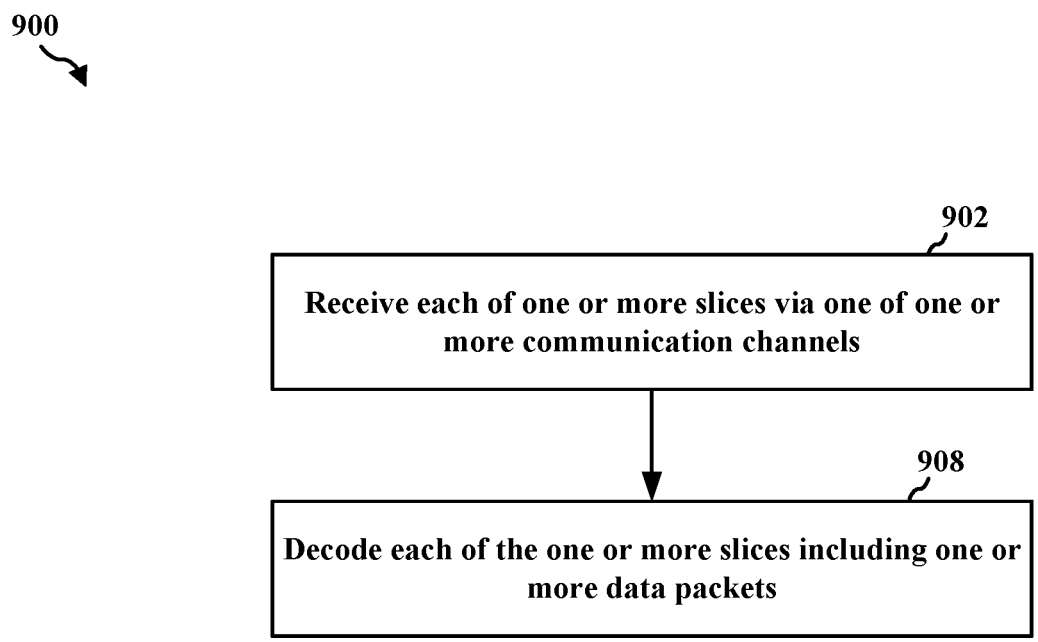
FIG. 9 illustrates an example flowchart of an example method in accordance with one or more techniques of this disclosure.

FIG. 9 illustrates a flowchart 900 of an example method in accordance with one or more techniques of this disclosure. The method may be performed by an apparatus such as a server, a client device, a display, or an apparatus for video or frame processing.

At 902, the apparatus may receive each of the one or more slices via one of one or more communication channels, the one or more slices corresponding to at least one frame of a plurality of frames in a video stream, each of the one or more slices including one or more data packets, each of the one or more slices being mapped to the one of the one or more communication channels, as described in connection with the examples in FIGS. 3-6. For example, client device 604 may receive each of the one or more slices via one of one or more communication channels, the one or more slices corresponding to at least one frame of a plurality of frames in a video stream, each of the one or more slices including one or more data packets, each of the one or more slices being mapped to the one of the one or more communication channels, as described in connection with 642 in FIG. 6. Further, 902 may be performed by display processor 127 in FIG. 1.

In some aspects, each of the one or more slices may be mapped to one of the one or more communication channels, as described in connection with the examples in FIGS. 3-6. Also, each of the one or more slices may be received over one of the one or more communication channels, as described in connection with the examples in FIGS. 3-6. Further, the at least one frame may be received based on a reliable delivery protocol, as described in connection with the examples in FIGS. 3-6.

In some aspects, an order of communication for each of the one or more slices may be based on content of each of the one or more slices, as described in connection with the examples in FIGS. 3-6. Additionally, the at least one frame including the one or more slices may be received by a client device from a server, as described in connection with the examples in FIGS. 3-6. The content of each of the one or more slices may correspond to a portion of content in the at least one frame, as described in connection with the examples in FIGS. 3-6. Also, the content of each of the one or more slices may be based on a motion detector, as described in connection with the examples in FIGS. 3-6.

In some aspects, each of the one or more data packets may be associated with a timeout period, as described in connection with the examples in FIGS. 3-6. Also, each of the one or more data packets that are unsuccessfully received may be associated with the timeout period, as described in connection with the examples in FIGS. 3-6. Further, the timeout period for each of the one or more data packets may be based on content of each of the one or more data packets, as described in connection with the examples in FIGS. 3-6. Also, the timeout period for each of the one or more data packets may be based on one or more motion vectors from a previous frame, as described in connection with the examples in FIGS. 3-6.

At 908, the apparatus may decode each of the one or more slices including the one or more data packets, as described in connection with the examples in FIGS. 3-6. For example, client device 604 may decode each of the one or more slices including the one or more data packets, as described in connection with 690 in FIG. 6. Further, 908 may be performed by display processor 127 in FIG. 1.

Figure 10:
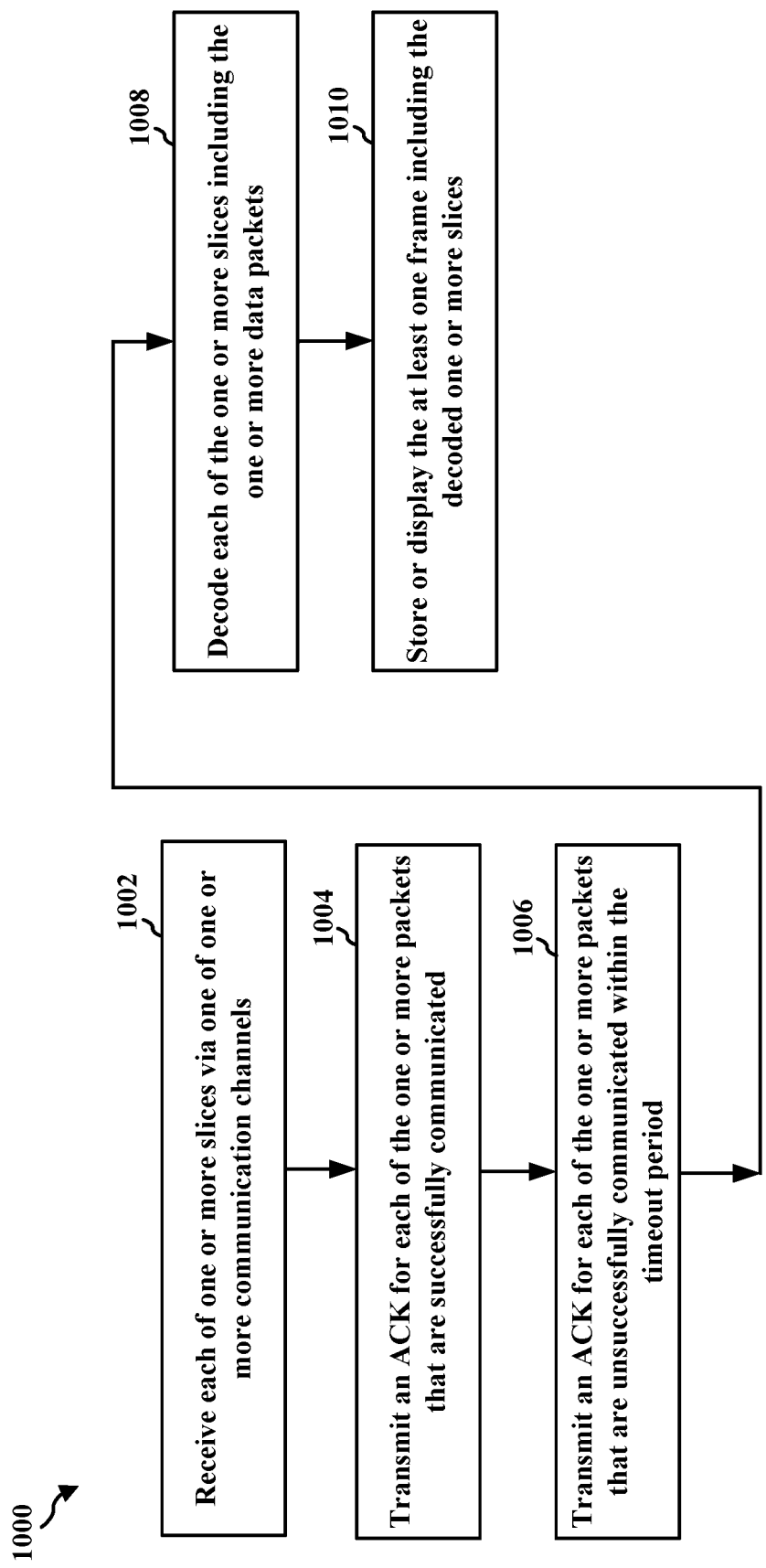
FIG. 10 illustrates an example flowchart of an example method in accordance with one or more techniques of this disclosure.

FIG. 10 illustrates a flowchart 1000 of an example method in accordance with one or more techniques of this disclosure. The method may be performed by an apparatus such as a server, a client device, a display, or an apparatus for video or frame processing.

At 1002, the apparatus may receive each of the one or more slices via one of one or more communication channels, the one or more slices corresponding to at least one frame of a plurality of frames in a video stream, each of the one or more slices including one or more data packets, each of the one or more slices being mapped to the one of the one or more communication channels, as described in connection with the examples in FIGS. 3-6. For example, client device 604 may receive each of the one or more slices via one of one or more communication channels, the one or more slices corresponding to at least one frame of a plurality of frames in a video stream, each of the one or more slices including one or more data packets, each of the one or more slices being mapped to the one of the one or more communication channels, as described in connection with 642 in FIG. 6. Further, 1002 may be performed by display processor 127 in FIG. 1.

In some aspects, each of the one or more slices may be mapped to one of the one or more communication channels, as described in connection with the examples in FIGS. 3-6. Also, each of the one or more slices may be received over one of the one or more communication channels, as described in connection with the examples in FIGS. 3-6. Further, the at least one frame may be received based on a reliable delivery protocol, as described in connection with the examples in FIGS. 3-6.

In some aspects, an order of communication for each of the one or more slices may be based on content of each of the one or more slices, as described in connection with the examples in FIGS. 3-6. Additionally, the at least one frame including the one or more slices may be received by a client device from a server, as described in connection with the examples in FIGS. 3-6.

The content of each of the one or more slices may correspond to a portion of content in the at least one frame, as described in connection with the examples in FIGS. 3-6. Also, the content of each of the one or more slices may be based on a motion detector, as described in connection with the examples in FIGS. 3-6.

At 1004, the apparatus may transmit an acknowledgment (ACK) for each of the one or more data packets that is successfully received, as described in connection with the examples in FIGS. 3-6. For example, client device 604 may transmit an acknowledgment (ACK) for each of the one or more data packets that is successfully received, as described in connection with 660 in FIG. 6. Further, 1004 may be performed by display processor 127 in FIG. 1.

In some aspects, each of the one or more data packets may be associated with a timeout period, as described in connection with the examples in FIGS. 3-6. Also, each of the one or more data packets that are unsuccessfully received may be associated with the timeout period, as described in connection with the examples in FIGS. 3-6. Further, the timeout period for each of the one or more data packets may be based on content of each of the one or more data packets, as described in connection with the examples in FIGS. 3-6. Also, the timeout period for each of the one or more data packets may be based on one or more motion vectors from a previous frame, as described in connection with the examples in FIGS. 3-6.

At 1006, the apparatus may transmit an ACK for each of the one or more data packets that is unsuccessfully received within the timeout period, as described in connection with the examples in FIGS. 3-6. For example, client device 604 may transmit an ACK for each of the one or more data packets that is unsuccessfully received within the timeout period, as described in connection with 680 in FIG. 6. Further, 1006 may be performed by display processor 127 in FIG. 1.

At 1008, the apparatus may decode each of the one or more slices including the one or more data packets, as described in connection with the examples in FIGS. 3-6. For example, client device 604 may decode each of the one or more slices including the one or more data packets, as described in connection with 690 in FIG. 6. Further, 1008 may be performed by display processor 127 in FIG. 1.

At 1010, the apparatus may store the at least one frame including the decoded one or more slices and/or display the at least one frame including the decoded one or more slices, as described in connection with the examples in FIGS. 3-6. For example, client device 604 may store the at least one frame including the decoded one or more slices and/or display the at least one frame including the decoded one or more slices, as described in connection with 692 in FIG. 6. Further, 1010 may be performed by display processor 127 in FIG. 1.

In one configuration, a method or apparatus for graphics processing is provided. The apparatus may be a server, a client device, a display, or an apparatus for video or frame processing, or some other processor that may perform video or frame processing. In one aspect, the apparatus may be the display processor 127 within the device 104, or may be some other hardware within device 104 or another device. The apparatus may include means for determining or configuring at least one frame of a video stream. The apparatus may also include means for dividing the at least one frame into one or more slices, each of the one or more slices including one or more data packets. The apparatus may also include means for transmitting each of the one or more slices via the one of the one or more communication channels. The apparatus may also include means for mapping each of the one or more slices to one of the one or more communication channels. The apparatus may also include means for encoding each of the one or more slices including the one or more data packets. The apparatus may also include means for calculating a timeout period for each of the one or more data packets. The apparatus may also include means for retransmitting each of the one or more data packets that are unsuccessfully transmitted/received within the timeout period. The apparatus may also include means for receiving an acknowledgment (ACK) for each of the one or more data packets that are unsuccessfully transmitted/received within the timeout period. The apparatus may also include means for analyzing content of each of the one or more slices of the at least one frame. The apparatus may also include means for receiving an acknowledgment (ACK) for each of the one or more data packets that are successfully transmitted/received. The apparatus may also include means for generating the at least one frame of the video stream. The apparatus may also include means for receiving each of the one or more slices via one of one or more communication channels, the one or more slices corresponding to at least one frame of a plurality of frames in a video stream, each of the one or more slices including one or more data packets, each of the one or more slices being mapped to the one of the one or more communication channels. The apparatus may also include means for decoding each of the one or more slices including the one or more data packets. The apparatus may also include means for storing the at least one frame including the decoded one or more slices and/or means for displaying the at least one frame including the decoded one or more slices. The apparatus may also include means for transmitting an acknowledgment (ACK) for each of the one or more data packets that are unsuccessfully communicated within the timeout period. The apparatus may also include means for transmitting an acknowledgment (ACK) for each of the one or more data packets that are successfully communicated.

The subject matter described herein may be implemented to realize one or more benefits or advantages. For instance, the described graphics processing techniques may be used by a server, a client device, a display, or some other processor that may perform video or frame processing to implement the reliable transmission described herein. This may also be accomplished at a low cost compared to other video processing techniques. Moreover, the video processing techniques herein may improve or speed up data processing or execution. Further, the video processing techniques herein may improve resource or data utilization and/or resource efficiency. Additionally, aspects of the present disclosure may more accurately transmit data packets in a remote VR or AR system.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware. Various examples have been described. These and other examples are within the scope of the claims below.

The following aspects are illustrative only and may be combined with other aspects or teachings described herein, without limitation.

Aspect 1 is an apparatus for video processing including at least one processor coupled to a memory and configured to: configure at least one frame of plurality of frames in a video stream; divide the at least one frame into one or more slices, each of the one or more slices including one or more data packets; map each of the one or more slices to one of one or more communication channels; and transmit each of the one or more slices including the one or more data packets via the one of the one or more communication channels.

Aspect 2 is the apparatus of aspect 1, where the at least one processor is further configured to: encode each of the one or more slices including the one or more data packets.

Aspect 3 is the apparatus of any of aspects 1 and 2, where the at least one processor is further configured to: calculate a timeout period for each of the one or more data packets.

Aspect 4 is the apparatus of any of aspects 1 to 3, where the timeout period is calculated for each of the one or more data packets that is unsuccessfully transmitted.

Aspect 5 is the apparatus of any of aspects 1 to 4, where the at least one processor is further configured to: retransmit each of the one or more data packets that is unsuccessfully transmitted within the timeout period.

Aspect 6 is the apparatus of any of aspects 1 to 5, where the at least one processor is further configured to: receive an acknowledgment (ACK) for each of the one or more data packets that is unsuccessfully transmitted within the timeout period.

Aspect 7 is the apparatus of any of aspects 1 to 6, where the timeout period for each of the one or more data packets is based on content of each of the one or more data packets.

Aspect 8 is the apparatus of any of aspects 1 to 7, where the timeout period for each of the one or more data packets is based on one or more motion vectors from a previous frame.

Aspect 9 is the apparatus of any of aspects 1 to 8, where the at least one processor is further configured to: analyze content of each of the one or more slices of the at least one frame.

Aspect 10 is the apparatus of any of aspects 1 to 9, where the content of each of the one or more slices corresponds to a portion of content in the at least one frame.

Aspect 11 is the apparatus of any of aspects 1 to 10, where the content of each of the one or more slices is analyzed with a motion detector.

Aspect 12 is the apparatus of any of aspects 1 to 11, where the at least one processor is further configured to: receive an acknowledgment (ACK) for each of the one or more data packets that is successfully transmitted.

Aspect 13 is the apparatus of any of aspects 1 to 12, where each of the one or more slices is transmitted based on a reliable delivery protocol.

Aspect 14 is the apparatus of any of aspects 1 to 13, where an order of communication for each of the one or more slices is based on content of each of the one or more slices.

Aspect 15 is the apparatus of any of aspects 1 to 14, where the at least one processor is further configured to: generate the at least one frame of the video stream.

Aspect 16 is the apparatus of any of aspects 1 to 15, where each of the one or more slices is transmitted from a server to a client device.

Aspect 17 is the apparatus of any of aspects 1 to 16, further including a transceiver coupled to the at least one processor.

Aspect 18 is a method of wireless communication for implementing any of aspects 1 to 17.

Aspect 19 is an apparatus for wireless communication including means for implementing any of aspects 1 to 17.

Aspect 20 is a computer-readable medium storing computer executable code, where the code when executed by a processor causes the processor to implement any of aspects 1 to 17.

Aspect 21 is an apparatus for video processing including at least one processor coupled to a memory and configured to: receive each of one or more slices via one of one or more communication channels, the one or more slices corresponding to at least one frame of a plurality of frames in a video stream, each of the one or more slices including one or more data packets, each of the one or more slices being mapped to the one of the one or more communication channels; and decode each of the one or more slices including the one or more data packets.

Aspect 22 is the apparatus of aspect 21, where the at least one processor is further configured to: store the at least one frame including the decoded one or more slices and/or display the at least one frame including the decoded one or more slices.

Aspect 23 is the apparatus of any of aspects 21 and 22, where each of the one or more data packets is associated with a timeout period.

Aspect 24 is the apparatus of any of aspects 21 to 23, where each of the one or more data packets that is unsuccessfully received is associated with the timeout period.

Aspect 25 is the apparatus of any of aspects 21 to 24, where the at least one processor is further configured to: transmit an acknowledgment (ACK) for each of the one or more data packets that is unsuccessfully received within the timeout period.

Aspect 26 is the apparatus of any of aspects 21 to 25, where the timeout period for each of the one or more data packets is based on content of each of the one or more data packets.

Aspect 27 is the apparatus of any of aspects 21 to 26, where the timeout period for each of the one or more data packets is based on one or more motion vectors from a previous frame.

Aspect 28 is the apparatus of any of aspects 21 to 27, where content of each of the one or more slices corresponds to a portion of content in the at least one frame.

Aspect 29 is the apparatus of any of aspects 21 to 28, where the content of each of the one or more slices is based on a motion detector.

Aspect 30 is the apparatus of any of aspects 21 to 29, where the at least one processor is further configured to: transmit an acknowledgment (ACK) for each of the one or more data packets that is successfully received.

Aspect 31 is the apparatus of any of aspects 21 to 30, where each of the one or more slices including the one or more data packets is received based on a reliable delivery protocol.

Aspect 32 is the apparatus of any of aspects 21 to 31, where an order of communication for each of the one or more slices is based on content of each of the one or more slices.

Aspect 33 is the apparatus of any of aspects 21 to 32, where each of the one or more slices is received by a client device from a server.

Aspect 34 is the apparatus of any of aspects 21 to 33, further including a transceiver coupled to the at least one processor.

Aspect 35 is a method of wireless communication for implementing any of aspects 21 to 34.

Aspect 36 is an apparatus for wireless communication including means for implementing any of aspects 21 to 34.

Aspect 37 is a computer-readable medium storing computer executable code, where the code when executed by a processor causes the processor to implement any of aspects 21 to 34.

What is claimed is:

1. An apparatus for video processing, comprising:
   memory; and
   at least one processor coupled to the memory and configured to:
   configure at least one frame of plurality of frames in a video stream;
   divide the at least one frame into one or more slices, each of the one or more slices including one or more data packets;
   map each of the one or more slices to one of one or more communication channels;
   transmit each of the one or more slices including the one or more data packets via the one of the one or more communication channels;
   calculate a timeout period for each of the one or more data packets;
   analyze one or more motion vectors from a previous frame to determine a presence of motion vectors for each of the one or more slices including the one or more data packets; and
   adjust the timeout period for each of the one or more data packets based on the presence of motion vectors for each of the one or more slices including the one or more data packets.

2. The apparatus of claim 1, wherein the at least one processor is further configured to:
   encode each of the one or more slices including the one or more data packets.

3. The apparatus of claim 1, wherein to calculate the timeout period for each of the one or more data packets, the at least one processor is configured to calculate the timeout period for each of the one or more data packets that is unsuccessfully transmitted.

4. The apparatus of claim 3, wherein the at least one processor is further configured to:
   retransmit each of the one or more data packets that is unsuccessfully transmitted within the timeout period.

5. The apparatus of claim 3, wherein the at least one processor is further configured to:
   receive an acknowledgment (ACK) for each of the one or more data packets that is unsuccessfully transmitted within the timeout period.

6. The apparatus of claim 1, wherein the timeout period for each of the one or more data packets is based on content of each of the one or more data packets.

7. The apparatus of claim 1, wherein the at least one processor is further configured to:
   analyze content of each of the one or more slices of the at least one frame.

8. The apparatus of claim 7, wherein the content of each of the one or more slices corresponds to a portion of content in the at least one frame.

9. The apparatus of claim 7, wherein to analyze the content of each of the one or more slices, the at least one processor is configured to analyze the content of each of the one or more slices with a motion detector.

10. The apparatus of claim 1, wherein the at least one processor is further configured to:
    receive an acknowledgment (ACK) for each of the one or more data packets that is successfully transmitted.

11. The apparatus of claim 1, wherein to transmit each of the one or more slices, the at least one processor is configured to transmit each of the one or more slices based on a reliable delivery protocol.

12. The apparatus of claim 1, wherein an order of communication for each of the one or more slices is based on content of each of the one or more slices.

13. The apparatus of claim 1, wherein the at least one processor is further configured to:
    generate the at least one frame of the video stream.

14. The apparatus of claim 1, wherein to transmit each of the one or more slices, the at least one processor is configured to transmit each of the one or more slices to a client device.

15. The apparatus of claim 1, further comprising a transceiver coupled to the at least one processor.

16. A method of video processing, comprising:
    configuring at least one frame of plurality of frames in a video stream;

dividing the at least one frame into one or more slices, each of the one or more slices including one or more data packets;

mapping each of the one or more slices to one of one or more communication channels;

transmitting each of the one or more slices including the one or more data packets via the one of the one or more communication channels;

calculating a timeout period for each of the one or more data packets;

analyzing one or more motion vectors from a previous frame to determine a presence of motion vectors for each of the one or more slices including the one or more data packets; and adjusting the timeout period for each of the one or more data packets based on the presence of motion vectors for each of the one or more slices including the one or more data packets.

17. An apparatus for video processing, comprising:
memory; and
at least one processor coupled to the memory and configured to:
  receive each of one or more slices via one of one or more communication channels, the one or more slices corresponding to at least one frame of a plurality of frames in a video stream, each of the one or more slices including one or more data packets, each of the one or more slices being mapped to the one of the one or more communication channels;
  decode each of the one or more slices including the one or more data packets;
  calculate a timeout period for each of the one or more data packets;
  analyze one or more motion vectors from a previous frame to determine a presence of motion vectors for each of the one or more slices including the one or more data packets; and
  adjust the timeout period for each of the one or more data packets based on the presence of motion vectors for each of the one or more slices including the one or more data packets.

18. The apparatus of claim 17, wherein the at least one processor is further configured to:
  store the at least one frame including the decoded one or more slices; or
  display the at least one frame including the decoded one or more slices.

19. The apparatus of claim 17, wherein each of the one or more data packets is associated with the timeout period.

20. The apparatus of claim 17, wherein the at least one processor is further configured to:
  transmit an acknowledgment (ACK) for each of the one or more data packets that is unsuccessfully received within the timeout period.

21. The apparatus of claim 19, wherein the timeout period for each of the one or more data packets is based on content of each of the one or more data packets.

22. The apparatus of claim 17, wherein content of each of the one or more slices corresponds to a portion of content in the at least one frame.

23. The apparatus of claim 22, wherein the content of each of the one or more slices is based on a motion detector.

24. The apparatus of claim 17, wherein the at least one processor is further configured to:
  transmit an acknowledgment (ACK) for each of the one or more data packets that is successfully received.

25. The apparatus of claim 17, wherein to receive each of the one or more slices, the at least one processor is configured to receive each of the one or more slices including the one or more data packets based on a reliable delivery protocol.

26. The apparatus of claim 17, wherein an order of communication for each of the one or more slices is based on content of each of the one or more slices.

27. The apparatus of claim 17, wherein to receive each of the one or more slices, the at least one processor is configured to receive each of the one or more slices from a server.

28. The apparatus of claim 17, further comprising a transceiver coupled to the at least one processor.

29. A method of video processing, comprising:
  receiving each of one or more slices via one of one or more communication channels, the one or more slices corresponding to at least one frame of a plurality of frames in a video stream, each of the one or more slices including one or more data packets, each of the one or more slices being mapped to the one of the one or more communication channels;
  decoding each of the one or more slices including the one or more data packets;
  calculating a timeout period for each of the one or more data packets;
  analyzing one or more motion vectors from a previous frame to determine a presence of motion vectors for each of the one or more slices including the one or more data packets; and
  adjusting the timeout period for each of the one or more data packets based on the presence of motion vectors for each of the one or more slices including the one or more data packets.

* * * * *